United States Patent
Kiessling (10) Patent No.: US 10,298,380 B2
(45) Date of Patent: May 21, 2019

(54) METHOD FOR TRANSMITTING DATA IN A COMMUNICATION NETWORK OF AN INDUSTRIAL AUTOMATION SYSTEM AND COUPLING COMMUNICATION DEVICE

(71) Applicant: Siemens Aktiengesellschaft, Munich (DE)

(72) Inventor: Marcel Kiessling, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 234 days.

(21) Appl. No.: 14/966,865

(22) Filed: Dec. 11, 2015

(65) Prior Publication Data
US 2016/0182394 A1    Jun. 23, 2016

(30) Foreign Application Priority Data
Dec. 22, 2014   (EP) ..................................... 14199774

(51) Int. Cl.
*H04J 3/06*       (2006.01)
*H04L 5/22*       (2006.01)
(Continued)

(52) U.S. Cl.
CPC .............. *H04L 5/22* (2013.01); *H04J 3/0652* (2013.01); *H04L 29/06884* (2013.01);
(Continued)

(58) Field of Classification Search
CPC .. H04L 29/06884; H04L 47/22; H04M 3/367; H04W 28/02; H04J 3/0652;
(Continued)

(56) References Cited

U.S. PATENT DOCUMENTS 7,969,985 B1 *   6/2011   Cline .................. H04L 12/4035
                                              370/394
2007/0268830 A1 * 11/2007  Li ........................ H04L 49/351
                                              370/235
(Continued)

FOREIGN PATENT DOCUMENTS

EP       2 827 207 A1    1/2015
WO    WO 2014/072374 A1  5/2014

OTHER PUBLICATIONS

Feld J,: "Profinet—scalable factory communication for all applications"; Factory Communications Systems 2004; Proceedings 2004 IEEE International Workshop in Vienna; Austria; pp. 33-38.*
(Continued)

*Primary Examiner* — Salvador E Rivas
(74) *Attorney, Agent, or Firm* — Cozen O'Connor (57) ABSTRACT

Method for transmitting data in a communication network of an industrial automation system and coupling communication device wherein in order to transmit data in a communication network of the industrial automation system, first data frames including control data for the automation system are transmitted by coupling communication devices of the communication network only within periodic first intervals of time, where second data frames, which are assigned to data streams comprising sequences of data frames, and/or third data frames, for the transmission of which no quality of service or a quality of service below a predefined threshold value is stipulated, are transmitted within periodic second intervals of time, the first intervals of time are subdivided into first and second sub-intervals, and where first data frames which are to be forwarded are inserted into a first and a second queue in alternating sub-intervals and are alternately removed from the queues for forwarding.

20 Claims, 4 Drawing Sheets

(51) Int. Cl.

| | | |
|---|---|---|
| *H04L 29/06* | (2006.01) | |
| *H04L 12/815* | (2013.01) | |
| *H04W 28/02* | (2009.01) | |
| *H04N 21/647* | (2011.01) | |
| *H04L 29/08* | (2006.01) | |
| *H04N 21/8547* | (2011.01) | |
| *H04N 21/236* | (2011.01) | |
| *H04N 21/43* | (2011.01) | |

(52) U.S. Cl.
CPC ............ *H04L 47/22* (2013.01); *H04L 67/125* (2013.01); *H04N 21/647* (2013.01); *H04W 28/02* (2013.01); *H04N 21/236* (2013.01); *H04N 21/4305* (2013.01); *H04N 21/8547* (2013.01)

(58) Field of Classification Search
CPC ............ H04N 21/236; H04N 21/4305; H04N 21/647; H04N 21/8547
See application file for complete search history.

(56) References Cited

U.S. PATENT DOCUMENTS

| | | | |
|---|---|---|---|
| 2011/0182300 A1* | 7/2011 | Chandhoke | H04L 12/40013 370/438 |
| 2012/0137013 A1* | 5/2012 | Steindl | H04J 3/0673 709/230 |
| 2013/0195114 A1* | 8/2013 | Lessmann | H04L 12/4015 370/401 |
| 2014/0341220 A1* | 11/2014 | Lessmann | H04L 12/40032 370/392 |
| 2016/0072929 A1* | 3/2016 | Alsup | H04L 12/40156 370/392 |

OTHER PUBLICATIONS

Feld J,: "Profinet—scalable factory communication for all applications"; Factory Communications Systems 2004; Proceedings 2004 IEEE International Workshop in Vienna; Austria; pp. 33-38 (Year: 2004).*

Karunagaran S. et al.: "MAESTRO: A Time-Driven Embedded Testbed Architecture with Event-Driven Synchronization"; 11th IEEE, IEEE Comput. Soc. Proceedings. RTAS 2005; 11th IEEE Real Time and Embedded Technology and Applications Symposium; Piscataway; NJ, USA, IEEE; pp. 237-248; XP032722396; ISSN: 1080-1812, DOI: 10.1109/RTAS.2014.6926006; ISBN: 0-7695-2302-1; 2014.

"Deterministic Ethernet; 8021-tutorial-final-v4"; IEEE Draft; 8021-Tutorial-Final-V4; IEEE-SA Piscataway, USA; Bd. 802; Nr. v4; pp. 1-72; XP017755049; 2012.

Vitullo F. et al.: "Low-Complexity Link Microarchitecture for Mesochronous Communication in Networks-on-Chip"; IEEE Transactions on Computers, IEEE Service Center, Los Alamitos, CA, US; Bd. 57; No. 9; pp. 1196-1201; XP011227330; ISSN: 0018-9340, DOI: 10.1109/TC.2008.48; 2008.

Schmidt E. G. et al.: "Message Scheduling for the Flex Ray Protocol: The Dynamic Segment" IEEE; Transactions on Vehicular Technology; IEEE Service Center; Piscataway; NJ; US. Bd. 5 8; Nr. 5, pp. 2160-2169; XP011248759; ISSN: 0018-9545; 2009.

Steinbach T. et al.: "Comparing Time-Triggered Ethernet with FlexRay: An Evaluation of Competing Approaches to Real-time for In-Vehicle Networks"; Factory Communication Systems (WFCS); 8th IEEE International Workshop on ; IEEE, Piscataway USA; pp. 199-202; XP031732723; ISBN: 978-1-4244-5460-0; 2010.

Feld J.: "Profinet—scalable factory communication for all applications"; Factory Communications Systems 2004; Proceedings 2004 IEEE International Workshop in Vienna; Austria; pp. 33-38; XP010756130; DOI: 10.1109/WFCS.2004.1377673; ISBN: 978-0-7803-8734-8; 2004.

* cited by examiner

METHOD FOR TRANSMITTING DATA IN A COMMUNICATION NETWORK OF AN INDUSTRIAL AUTOMATION SYSTEM AND COUPLING COMMUNICATION DEVICE

BACKGROUND OF THE INVENTION

1. Field of the Invention

The invention relates to industrial communication systems and, more particularly, to a method for transmitting data in a communication network of an industrial automation system.

2. Description of the Related Art

In general, an industrial automation system comprises a multiplicity of automation devices networked to one another via an industrial communication network and is used to control or regulate installations, machines or devices during production or process automation. On account of time-critical framework conditions in technical systems automated using industrial automation systems, real-time communication protocols, such as PROFINET, PROFIBUS or real-time Ethernet, are predominantly used for communication between automation devices in industrial communication networks.

Interruptions in communication connections between computer units of an industrial automation system or automation devices may result in undesirable or unnecessary repetition of the transmission of a service request. This causes an additional use of communication connections of the industrial automation system, which may result in further system disruptions or faults. A particular problem in industrial automation systems regularly results from message traffic having a comparatively large number of relatively short messages, thus intensifying the above problems.

On account of use for often extremely different applications, problems may arise in Ethernet-based communication networks, for example, if network resources for transmitting short data frames with real-time requirements are used in competition for transmitting data frames with a large useful data content. This may result in delayed transmission of the data frames with real-time requirements or even in a loss of individual data frames of this type.

Prioritized transmission of data frames is fundamentally possible, for example, based on virtual local area networks (ULAN) in accordance with Institute of Electrical and Electronics Engineers (IEEE) 802.1Q standard using corresponding tags inserted into data frames. According to the IEEE 802.1Qav standard, bandwidth reservation for individual communication connections that are assigned the highest priority is provided for the synchronized and prioritized transmission of audio and video data streams (audio/video bridging) via communication networks. Here, resources needed to transmit audio and video data streams are reserved in communication devices, such as switches. However, high-priority data frames are forwarded only after successful reservation. During bandwidth monitoring, it is ensured that there is sufficiently reserved bandwidth with respect to the actually used bandwidth. A communication connection that uses more bandwidth than is reserved would otherwise result in a disruption in an entire communication network and, in the worst-case scenario, would result in a standstill of the communication network on account of overloading.

According to the IEEE 802.1 Qbv standard, credit-based shapers (CBS) have been defined as a measure of bandwidth monitoring for the secure transmission of audio and video data streams via Ethernet-based communication networks. Credit-based shapers are used to define a transmission pause after each transmitted data frame to ensure bandwidth limiting with respect to a reserved bandwidth. However, such compulsory pauses are extremely problematic in industrial automation systems when transmitting a large number of data frames with a low useful data content for control data, which rather can be considered to be data bundles or bursts. This is because control data must usually be transmitted and processed within a processing cycle. For example, at the start of a processing cycle, all sensors transmit control data to an assigned programmable logic controller. After subsequent calculation based on control data received from the sensors, the programmable logic controller transmits control data to actuators of the industrial automation system. A new sensor data query is then effected inside a next processing cycle. So that sufficient time remains for processing control data within a processing cycle, data frames containing control data should be transmitted as far as possible at the start of a processing cycle, in particular if decentralized peripherals or decentralized input and output units are used.

WO 2014/072374 A1 discloses a method for transmitting multicast data streams in an industrial automation system using link state routing protocols, in which routing tables are not calculated for all possible node-to-node connections but rather only for selected time-critical paths, in particular between "talkers" as data sources and "listeners" as subscribers of data sources in industrial automation systems. In order to calculate routing paths in such communication networks, information describing communication relationships is distributed inside the communication network using a link state routing protocol. The information relating to communication relationships comprises, for example, details of a summary of communication subscribers inside a multicast path or "talkers" and associated "listeners".

An older European patent application, having application number 13176454.0, describes a method for transmitting data frames using a communication device of an industrial automation system, in which a transmission priority is respectively assigned to data frames to be transmitted using the communication device. A transmitted data volume is recorded for data frames that are transmitted via at least one selected terminal of the communication device and have a transmission priority above a predefinable priority threshold value. The transmitted data volume is recorded periodically inside at least one monitoring cycle. The data volume recorded for each monitoring cycle pass is monitored for the exceeding of a predefinable volume threshold value. If the volume threshold value for a monitoring cycle pass is exceeded, the selected terminal is blocked against transmission of data frames having a transmission priority above the priority threshold value during a blocking time until an end of the respective monitoring cycle pass.

SUMMARY OF THE INVENTION

It is an object of the present invention to provide a coupling communication device and method for transmitting data in a communication network of an industrial automation system, which method makes it possible to reduce transit times and transit time fluctuations (jitter) when transmitting control data.

This and other objects and advantages are achieved in accordance with the invention by a coupling communication device and method in accordance with the invention for transmitting data in a communication network of an industrial automation system, wherein first data frames comprising control data for the automation system are transmitted by coupling communication devices of the communication network only within periodic first intervals of time. The coupling communication devices may be, for example, switches or bridges that are preferably time-synchronized with one another. The first intervals of time are each subdivided into at least a first and a second sub-interval. The first and second intervals of time are preferably complementary to one another. In addition, the first intervals of time may each be subdivided into a plurality of periodic first and second sub-intervals, first and second sub-intervals each alternately following one another.

In accordance with the invention, received first data frames that are to be forwarded are inserted into a first queue of a respective coupling communication device by the coupling communication devices during the first sub-intervals. Received first data frames that are to be forwarded are inserted into a second queue of the respective coupling communication device by the coupling communication devices during the second sub-intervals. Furthermore, first data frames are removed from the first queues for forwarding during a second sub-interval respectively following their insertion. First data frames are removed from the second queues for forwarding during a first sub-interval respectively following their insertion. In addition, second data frames, which are assigned to data streams comprising sequences of data frames, and/or third data frames, for the transmission of which no quality of service or a quality of service below a predefined threshold value is stipulated, are transmitted by the coupling communication devices only within periodic second intervals of time. As a result, it becomes possible to transmit control data with minimized transit times and jitter that is reduced to a phase length. Here, transit times can be determined, in particular, based on hops and phase length.

In accordance with an advantageous embodiment of the method in accordance with the invention, first data frames to be forwarded are forwarded substantially immediately by the respective coupling communication device if the first and second queues are empty. This enables an additional transit time reduction. In addition, first data frames to be forwarded are advantageously forwarded by the respective coupling communication device without delay if the first and second queues are empty until a sub-interval following their reception time. In accordance with another advantageous embodiment, if there is an empty queue and a filled queue, first data frames to be forwarded are removed from the filled queue and forwarded by the respective coupling communication device irrespective of a removal schedule predefined by first and second sub-intervals.

In accordance with a preferred embodiment of the method in accordance with the invention, a stipulated quality of service is respectively assigned to the second data frames for their transmission. Here, the second data frames are each transmitted with a prioritization and/or data rate corresponding to their assigned quality of service within the second intervals of time. In contrast, the third data frames can be transmitted without a priority in the sense of a "best effort" within the second intervals of time.

A respectively transmitted data volume is advantageously recorded for the second data frames by the coupling communication devices. In this case, the transmitted data volume is periodically recorded within a monitoring cycle comprising at least a first and a second interval of time. The data volume recorded for each monitoring cycle pass is also checked to determine whether it has exceeding a predefined volume threshold value. Transmission of the second data frames is aborted, paused and/or continued with a reduced prioritization if the volume threshold value is exceeded. The respective volume threshold value can be predefined by the quality of service respectively assigned to a data stream, for example. The recorded data volume is preferably respectively reset at the start of each monitoring cycle pass. Furthermore, the recorded data volume is advantageously reduced, in the case of paused transmission of second data frames, by a value proportional to the respective waiting time. In particular, the recorded data volume can be reduced, in the case of paused transmission of second data frames during a first interval of time as well, by a value proportional to the duration of the first interval of time.

A maximum use duration of a connection used most by a data stream, which is determined inside the communication network, can be stipulated as the duration for the first and second sub-intervals, for example. Alternatively, a time slot duration in a communication system having time-division multiplexing data transmission can be stipulated as the duration for the first and second sub-intervals. A further transit time and jitter reduction can be achieved because the first intervals of time are each subdivided into a plurality of periodic first and second sub-intervals, first and second sub-intervals each alternately following one another, and because an integer fraction of a time slot duration in a communication system having time-division multiplexing data transmission is stipulated as the duration for the first and second sub-intervals. Here, the coupling communication devices are preferably each operated in a transmission mode referred to as cut through.

It is also an object of the invention to provide a coupling communication device for an industrial automation system that implement the method in accordance with the disclosed embodiments and comprises a plurality of terminals for a connection to communication devices connected to one another inside an industrial communication network. Transmitting and receiving units (i.e., transmitters and receivers), which are assigned to the terminals and are assigned at least a first queue and a second queue, are also provided. In addition, the coupling communication device in accordance with the invention, such as a switch or a bridge, has a coupling element that connects the transmitters and receivers to one another. In addition, the coupling communication device is configured such that first data frames comprising control data for the automation system are transmitted only within periodic first intervals of time. Here, the first intervals of time are each subdivided at least into a first and a second sub-interval.

In accordance with the invention, the coupling communication device is configured such that received first data frames that are to be forwarded are inserted into the first queue during the first sub-intervals, and received first data frames that are to be forwarded are inserted into the second queue during the second sub-intervals. In addition, the coupling communication device is configured such that first data frames are removed from the first queue for forwarding during a second sub-interval respectively following their insertion, and first data frames are removed from the second queue for forwarding during a first sub-interval respectively following their insertion. In addition, the coupling communication device is configured such that second data frames, which are assigned to data streams comprising sequences of data frames, and/or third data frames, for the transmission of which no quality of service or a quality of service below a predefined threshold value is stipulated, are transmitted only within periodic second intervals of time.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
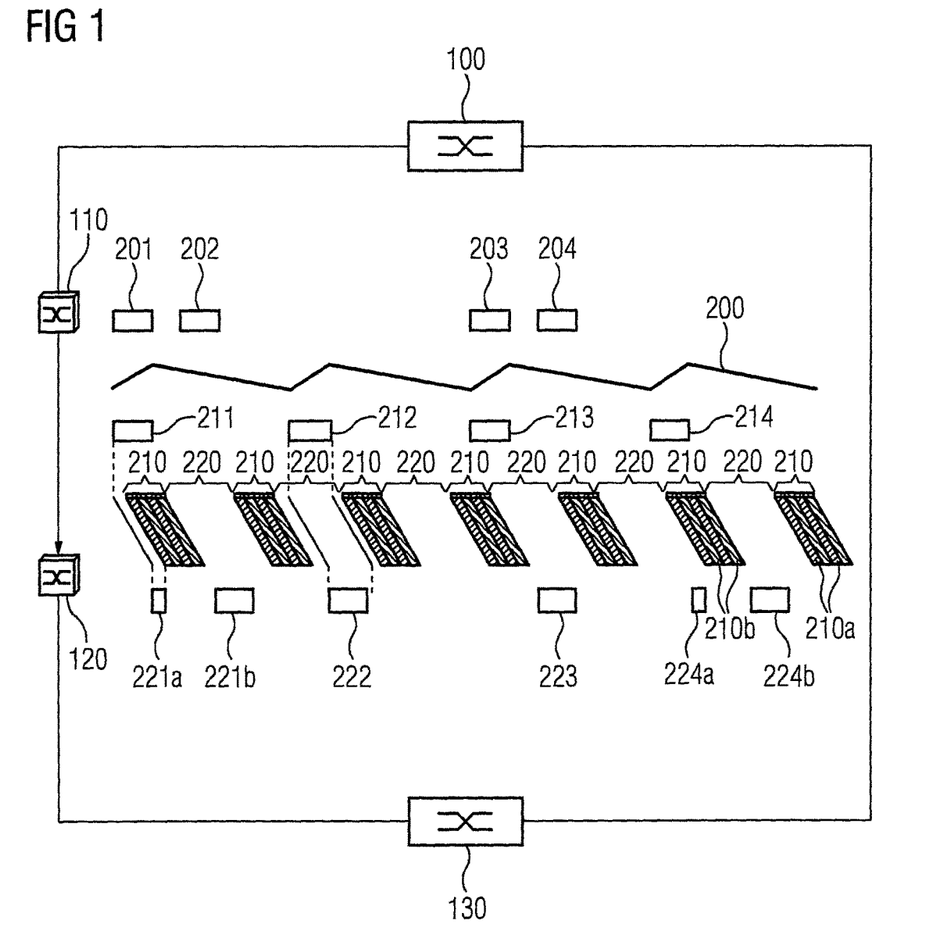
FIG. 1 shows a communication network having a plurality of switches and a schematic temporal illustration of transmission of data streams in accordance with the invention.

The communication network illustrated in FIG. 1 comprises a plurality of switches 100, 110, 120, 130 which, in the present exemplary embodiment, can be connected to one another inside a ring topology. However, in order to avoid the formation of a loop, precisely one terminal of one of the switches 100, 110, 120, 130 is operated in a state that does not forward useful data. Control or field devices of an industrial automation system, such as programmable logic controllers or decentralized peripherals, may respectively be connected to the switches 100, 110, 120, 130.

Figure 2:
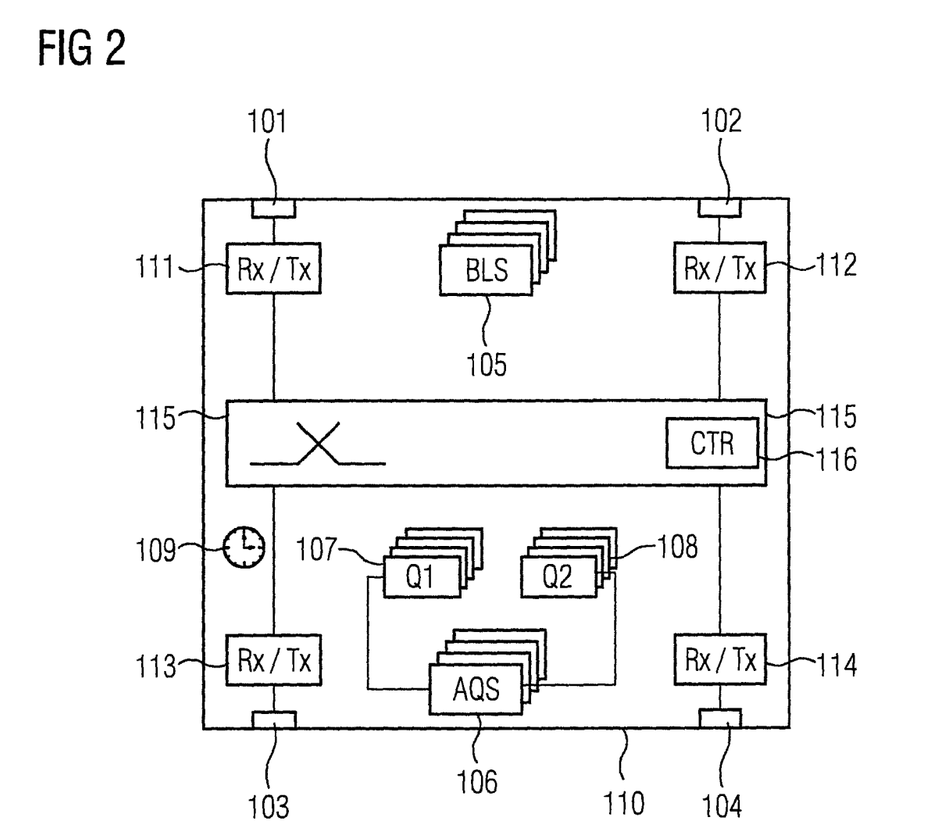
FIG. 2 shows a schematic illustration of a switch of FIG. 1 with two alternatingly fillable queues for each terminal.

In the present exemplary embodiment, the structure and functionality of the switches 100, 110, 120, 130 are identical. The switch 110 is schematically illustrated in FIG. 2 as representative of the switches 100, 110, 120, 130. In the present exemplary embodiment, the switch 110 comprises four transmitter and receiver units 111, 112, 113, 114 each having a terminal 101, 102, 103, 104, 104 for a communication connection inside an industrial automation system. The transmitter and receiver units 111, 112, 113, 114 are connected to one another in a controllable manner via a backplane switch 115 with an associated controller 116. A first queue 107 and a second queue 108 for transmitting control data for the automation system are respectively assigned to the transmitting and receiving units 111, 112, 113, 114. In this case, first data frames 301, 302, 303, 304, 311, 312, 313, 314, 401, 402, 411, 412 which are illustrated in more detail in FIGS. 3 and 4 and comprise control data for the automation system are transmitted by the switches 100, 110, 120, 130 only within periodic first intervals of time 210. In contrast, second data frames 201, 202, 203, 204, 211, 212, 213, 214, 221-224, which are assigned to data streams comprising sequences of data frames, and third data frames, for the transmission of which no quality of service or a quality of service below a predefined threshold value is stipulated, are transmitted only within periodic second intervals of time 220. In the present exemplary embodiment, the third data frames are transmitted without a priority within the second intervals of time 220 in accordance with the "best effort".

Figure 3:
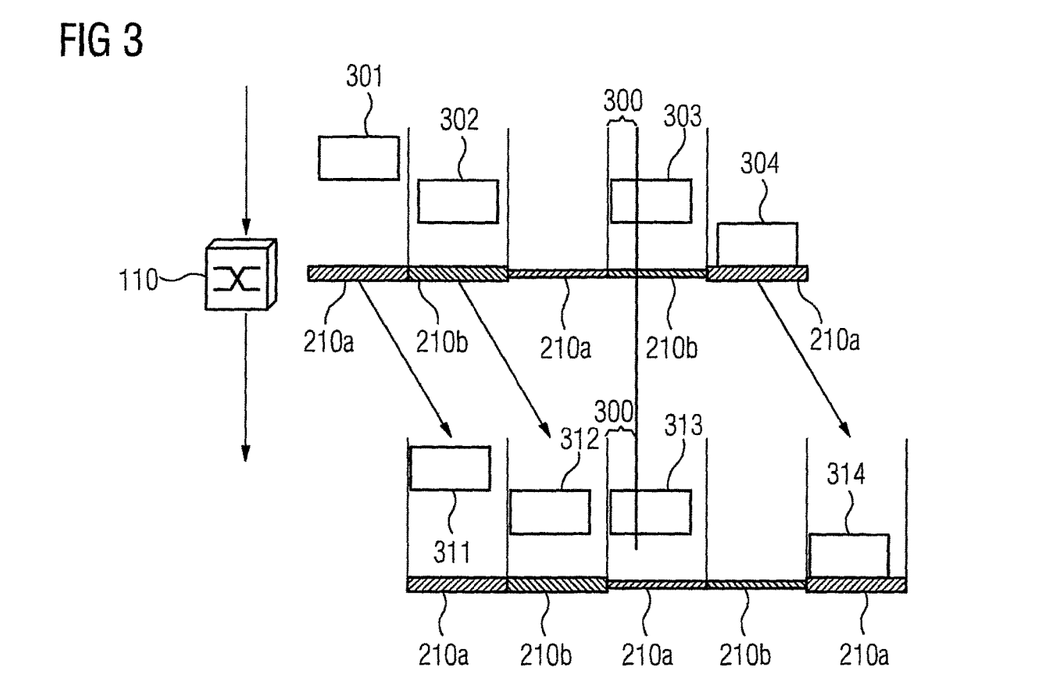
FIG. 3 shows a schematic temporal illustration of transmission of data frames for control data using a first variant of the switch of FIG. 2.
Figure 4:
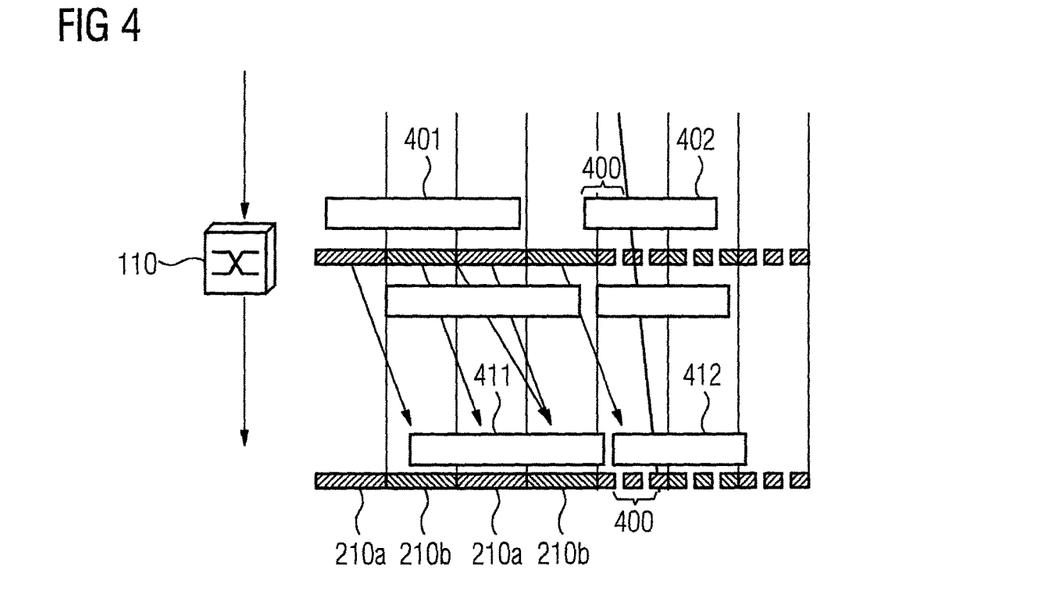
FIG. 4 shows a schematic temporal illustration of transmission of data frames for control data using a second variant of the switch of FIG. 2.

With reference to FIG. 1, the first and second intervals of time 210, 220 are complementary to one another. In principle, protection or blocking intervals of time may be additionally provided between the first and second intervals of time 210, 220. The switches 100, 110, 120, 130 are time-synchronized with one another. For this purpose, the switch 110 corresponding to FIG. 2 comprises a synchronization unit 109. With reference to FIG. 3, a time slot duration in a communication system having time-division multiplexing data transmission can be stipulated as the duration for the first and second sub-intervals 210a, 210b, for example. Alternatively, an integer fraction of a time slot duration in a communication system having time-division multiplexing data transmission may be stipulated as the duration for the first and second sub-intervals 210a, 210b, with the result that the duration corresponds to a sub-time slot (see FIG. 4). Here, the switches 100, 110, 120, 130 are preferably operated in the cut through transmission mode. In principle, a maximum use duration of a connection used most by a data stream, which is determined inside the communication network, can also be stipulated as the duration for the first and second sub-intervals 210a, 210b.

The first intervals of time 210 are each subdivided into a plurality of first sub-intervals 210a and second sub-intervals 210b, where the first and second sub-intervals 210a, 210b each alternately follow one another. Received first data frames 301, 302, 303, 304, 311, 312, 313, 314, 401, 402, 411, 412, which are to be forwarded, are inserted into the first queue 107 for the respective transmiter and receiver unit 111, 112, 113, 114 by the switches 100, 110, 120, 130 during the first sub-intervals 210a. In contrast, received first data frames 301, 302, 303, 304, 311, 312, 313, 314, 401, 402, 411, 412, which are to be forwarded, are inserted into the respective second queue 108 during the second sub-intervals 210b.

The first data frames are removed from the respective first queue for forwarding during a second sub-interval 210b respectively following their insertion. In a similar manner, first data frames are removed from the respective second queue for forwarding during a first sub-interval 210a respectively following their insertion. In order to control filling and removal of first data frames from the first and second queues 107, 108, the switch 110 corresponding to FIG. 2 comprises, for each pair of queues, a respective queue control unit 106 that implements an alternating queue changeover.

In addition, queue control units 106 are configured such that, if there is an empty queue and a filled queue in each case, first data frames 303, 402 to be forwarded are removed from the filled queue and forwarded by the respective switch irrespective of a removal schedule predefined by first and second sub-intervals 210a, 210b in the sense of a "shortest queue first". Therefore, in accordance with FIGS. 3 and 4 and in contrast to the forwarded first data frames 301, 302, 304, 401, the first data frames 313 and 412 forwarded by the switch 110, for example, do not have a delay by a time slot or a sub-time slot in comparison with the received first data frames 301, 302, 303, 304, 401, 402. The prerequisite for this, in accordance with the present exemplary embodiment, is that the respective first data frames 303, 402 are received within a predefined protection time 300, 400 from the start of the respective sub-interval.

A stipulated quality of service for their transmission is respectively assigned to the second data frames 201, 202, 203, 204, 211, 212, 213, 214, 221, 222, 223, 224. In this manner, the second data frames are each transmitted with a prioritization or data rate corresponding to their assigned quality of service within the second intervals of time 220. For this purpose, the switch 110 respectively comprises, for each transmitter and receiver 111, 112, 113, 114, a data volume recording unit 105 for implementing a burst limiting shaper or credit-based shaper for second data frames.

FIG. 1 illustrates a method of operation of a burst limiting shaper or credit-based shaper with respect to second data frames 201, 202, 203, 204 received by the switch 110 and for forwarding planned second data frames 211, 212, 213, 214. A respectively transmitted or planned data volume 200 is recorded for the second data frames using a burst limiting shaper or a credit-based shaper. Here, the transmitted or planned data volume 200 is periodically recorded within a monitoring cycle that comprises at least a first and a second interval of time 210, 220. In this case, the data volume recorded for each monitoring cycle pass is checked to determine whether it has exceeding a predefined volume threshold value. If the volume threshold value is exceeded, transmission of the second data frames is paused (credit-based shaper) or is continued with a reduced prioritization (burst limiting shaper). Here, the respective volume threshold value is predefined by the quality of service respectively assigned to a data stream. The recorded data volume is respectively reset at the start of each monitoring cycle pass. In the case of paused transmission of second data frames, the recorded data volume is reduced by a value proportional to the respective waiting time.

In accordance with the invention Second data frames are transmitted only within second intervals of time 220. As a result, the second data frames 211, 214 planned for forwarding to the switch 120 are transmitted with a pause, in contrast to the second data frames 212, 213. Accordingly, some 221*a*, 224*a* of the data frames 211, 214 are received by the switch 120 before the pause, whereas others 221*b*, 224*b* are received after the pause. In the present exemplary embodiment, in contrast, the received data frames 222, 223 coming from the transmitted data frames 212, 213 are subject only to a signal propagation time delay on a connection between the switches 110 and 120.

Figure 5:
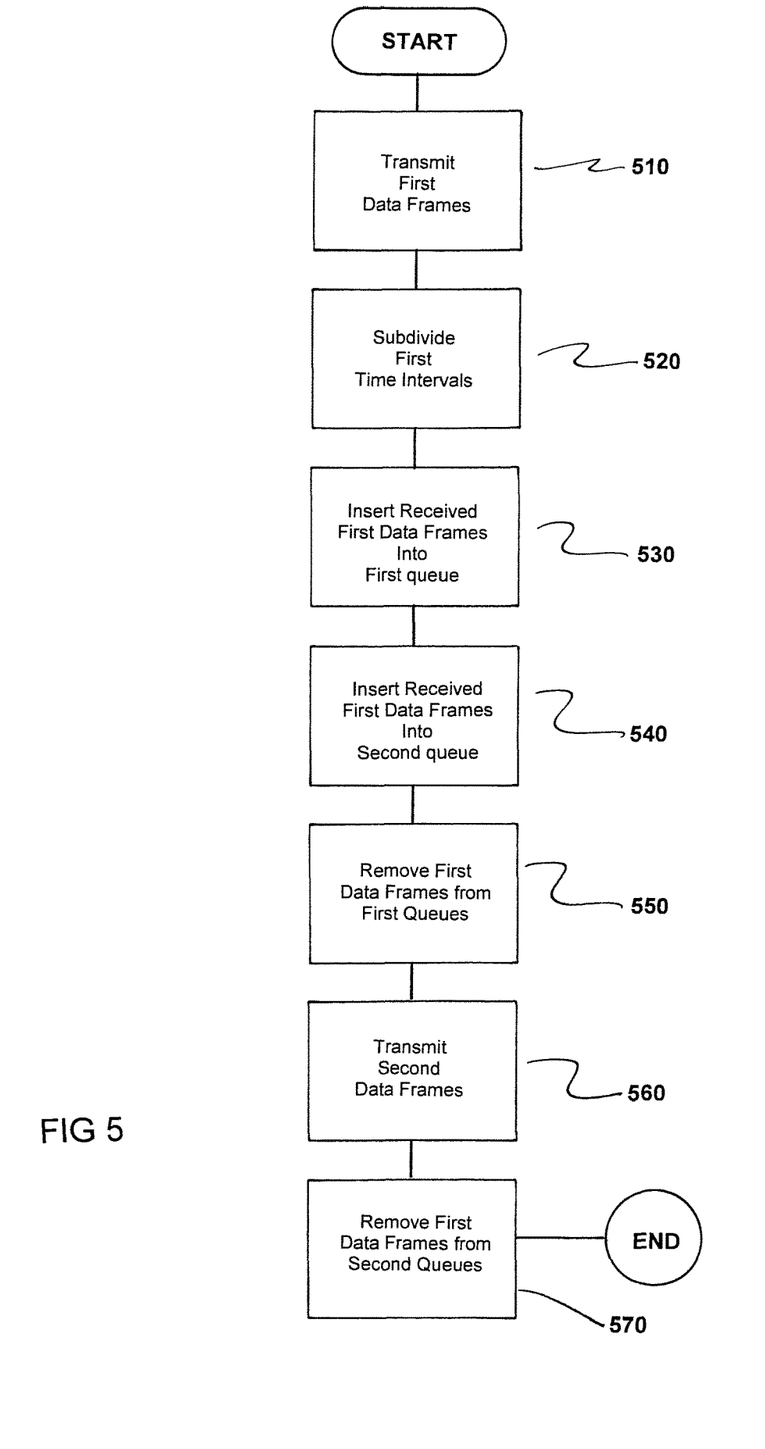
FIG. 5 is a flowchart of the method in accordance with the invention.

FIG. 5 is a flowchart of a method for transmitting data in a communication network of an industrial automation system. The method comprises transmitting first data frames comprising control data for the automation system, by coupling communication devices of the communication network, only within periodic first intervals of time, as indicated in step 510.

Next, each of the first intervals of time are subdivided into at least a first and a second sub-interval, as indicated in step 520. Next, received first data frames which are to be forwarded are inserted by the coupling communication devices into a first queue of a respective coupling communication device during the first sub-intervals, as indicated in step 530. Next, received first data frames which are to be forwarded are inserted by the coupling communication devices into a second queue of the respective coupling communication device during second sub-intervals, as indicated in step 540.

First data frames are now removed from first queues for forwarding during a second sub-interval respectively following their insertion, as indicated in step 550. First data frames are now removed from second queues for forwarding during a first sub-interval respectively following their insertion, as indicated in step 560.

Next, second data frames, which are assigned to data streams comprising at least one of (i) sequences of data frames and (ii) third data frames, for the transmission of which no quality of service or a quality of service below a predefined threshold value is stipulated, are transmitted by the coupling communication devices only within periodic second intervals of time, as indicated in step 570.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting data in a communication network of an industrial automation system, comprising:

transmitting first data frames comprising control data for the automation system, by coupling communication devices of the communication network which are time-synchronized with one another, only within periodic first intervals of time;

subdividing each of the first intervals of time into at least a first and a second sub-interval;

inserting, by the coupling communication devices which are time-synchronized with one another, received first data frames which are to be forwarded into a first queue of a respective coupling communication device during the first sub-intervals;

inserting, by the coupling communication devices which are time-synchronized with one another, received first data frames which are to be forwarded into a second queue of the respective coupling communication device during second sub-intervals;

removing first data frames from first queues for forwarding during a second sub-interval respectively following their insertion;

removing first data frames from second queues for forwarding during a first sub-interval respectively following their insertion;

transmitting, by the coupling communication devices which are time-synchronized with one another, second data frames, which are assigned to data streams comprising at least one of (i) sequences of data frames and (ii) third data frames, for the transmission of which no quality of service or a quality of service below a predefined threshold value is stipulated, only within periodic second intervals of time;

wherein a plurality of transmitters/receivers interconnected to each other in a controllable manner via a backplane switch with a controller are assigned to terminals and assigned at least the first queue and the second queue; and wherein first data frames to be forwarded are forwarded by the respective coupling communication device without delay if the first and second queues are empty until a sub-interval following their reception time.

2. The method as claimed in claim 1, wherein the first and second intervals of time are complementary to one another.

3. The method as claimed in claim 2, wherein the first intervals of time are each subdivided into a plurality of periodic first and second sub-intervals, first and second sub-intervals each alternately following one another.

4. The method as claimed in claim 1, wherein the first intervals of time are each subdivided into a plurality of periodic first and second sub-intervals, first and second sub-intervals each alternately following one another.

5. The method as claimed in claim 1, wherein first data frames to be forwarded are forwarded substantially immediately by the respective coupling communication device if the first and second queues are empty.

6. The method as claimed in claim 1, wherein, if an empty queue and a filled queue are present, first data frames to be forwarded are removed from the filled queue and forwarded by the respective coupling communication device irrespective of a removal schedule predefined by first and second sub-intervals.

7. The method as claimed in claim 1, wherein a stipulated quality of service is respectively assigned to the second data frames for their transmission; and wherein the second data frames are each transmitted with at least one of (i) a prioritization and (ii) data rate corresponding to their assigned quality of service within the second intervals of time.

8. The method as claimed in claim 1, wherein a respectively transmitted data volume is recorded for the second data frames by the coupling communication devices which are time-synchronized with one another;
wherein the transmitted data volume is periodically recorded within a monitoring cycle comprising at least a first and a second interval of time;
wherein the data volume recorded for each monitoring cycle pass is checked for the exceeding of a predefined volume threshold value; and
wherein transmission of the second data frames is at least one of (i) aborted, (ii) paused and (ii) continued with a reduced prioritization if the volume threshold value is exceeded.

9. The method as claimed in claim 8, wherein the respective volume threshold value is predefined by the quality of service respectively assigned to a data stream.

10. The method as claimed in claim 9, wherein the recorded data volume is respectively reset at the start of each monitoring cycle pass.

11. The method as claimed in claim 8, wherein the recorded data volume is respectively reset at the start of each monitoring cycle pass.

12. The method as claimed in claims 8, wherein the recorded data volume is reduced, in cases of paused transmission of second data frames, by a value proportional to a respective waiting time.

13. The method as claimed in claim 12, wherein the recorded data volume is reduced, in a case of paused transmission of second data frames during a first interval of time, by a value proportional to the duration of the first interval of time.

14. The method as claimed in claim 1, wherein the third data frames are transmitted without a priority within the second intervals of time.

15. The method as claimed in claim 1, wherein a maximum use duration of a connection used most by a data stream, which is determined inside the communication network, is stipulated as the duration for the first and second sub-intervals.

16. The method as claimed in claim 1, wherein a time slot duration in a communication system having time-division multiplexing data transmission is stipulated as the duration for the first and second sub-intervals.

17. The method as claimed in claim 1, wherein the first intervals of time are each subdivided into a plurality of periodic first and second sub-intervals, first and second sub-intervals each alternately following one another;
wherein an integer fraction of a time slot duration in a communication system having time-division multiplexing data transmission is stipulated as the duration for the first and second sub-intervals; and
wherein the coupling communication devices are each operated in a transmission mode referred to as cut through.

18. The method as claimed in claim 1, wherein the coupling communication devices comprises switches or bridges.

19. A coupling communication device for an industrial automation system, comprising:
a plurality of terminals for a connection to communication devices connected to one another inside an industrial communication network;
a plurality of transmitters/receivers interconnected to each other in a controllable manner via a backplane switch with a controller, the plurality of transmitters/receivers being assigned to the terminals and being assigned at least a first queue and a second queue;
a synchronizer which time-synchronizes the coupling communication device with other coupling communication devices; and
a coupler which interconnects the plurality of transmitters/receivers;
wherein the coupling communication device is configured such that:
first data frames comprising control data for the automation system are transmitted only within periodic first intervals of time, the first intervals of time each being subdivided at least into a first and a second sub-interval,
received first data frames which are to be forwarded are inserted into the first queue during the first sub-intervals,
received first data frames which are to be forwarded are inserted into the second queue during the second sub-intervals,
first data frames are removed from the first queue for forwarding during a second sub-interval respectively following their insertion,
first data frames are removed from the second queue for forwarding during a first sub-interval respectively following their insertion,
second data frames, which are assigned to data streams comprising at least one of (i) sequences of data frames and (ii) third data frames, for the transmission of which no quality of service or a quality of service below a predefined threshold value is stipulated, are transmitted only within periodic second intervals of time, and
first data frames to be forwarded are forwarded without delay if the first and second queues are empty until a sub-interval following their reception time.

20. The coupling communication device as claimed in claim 19, wherein the coupling communication device comprises a switch or a bridge.

* * * * *